United States Patent Office 3,472,793
Patented Oct. 14, 1969

3,472,793
METHOD OF PREPARING A CATALYTIC
COMPOSITE CONTAINING DISPERSED
ALUMINOSILICATE
Ernest L. Pollitzer, Hinsdale, and Lee Hilfman, Prospect Heights, Ill., assignors to Universal Oil Products Company, Des Plaines, Ill., a corporation of Delaware
No Drawing. Filed Nov. 18, 1966, Ser. No. 595,368
Int. Cl. B01j 11/40
U.S. Cl. 252—452        7 Claims

ABSTRACT OF THE DISCLOSURE

Preparation of a catalyst for removing nitrogen impurities from petroleum fractions by dispersing a crystalline alumino-silicate in an aqueous solution comprising ammonium hydroxide and aluminum sulfate in a ratio to effect a pH of from about 3.8 to about 4.5, commingling the resulting mixture with an acidified alkali metal silicate solution containing the anion of the acidification agent in a mole ratio of from about 1.1 to about 1.5 with the alkali metal content thereof, treating the resulting gel with a solution of a metal of Group II of the Periodic Table at base-exchange conditions and compositing the base-exchanged gel particles with at least one metal of Groups VI–B and VIII.

---

This invention relates to the catalytic hydrotreating of petroleum hydrocarbon fractions to separate nitrogenous compounds therefrom. More particularly, this invention relates to a catalytic composite especially adapted thereto and to a method of preparing the same.

Hydrocracking relates to the cracking of petroleum hydrocarbon fractions in the presence of hydrogen at hydrogenation conditions whereby, in contrast to conventional cracking, the lower boiling products are substantially more saturated then would be the case in the absence of hydrogen or suitable precursors thereof. Hydrocracking finds particularly utility in the conversion of higher boiling petroleum fractions i.e., those petroleum fractions boiling in the middle distillate range or higher, to form substantial yields of lower boiling petroleum hydrocarbons having a larger degree and latitude of applicability. Thus, higher boiling petroleum fractions including kerosene and gas oil fractions, lubricating and white oil stocks, cycle stocks and higher boiling materials, such as are recovered as fractionator bottoms of conventional catalytic cracking operations, are converted to more useful lower boiling petroleum fractions, usually comprising hydrocarbons boiling in the gasoline range.

Although hydrocracking can be accomplished thermally, the preferred processing techniques utilize a catalytic composite comprising a hydrogenation component as well as a cracking component. Most, if not all, hydrocracking catalysts are adversely affected by nitrogenous compounds, including such nitrogen-containing compounds as pyrroles, amines, indoles, and the like, which normally occur in the hydrocracking feed stocks. Such nitrogenous compounds induce a relatively rapid deactivation of both the metallic component which serves as the hydrogenation agent, and the solid carrier material which normally functions as the acidic cracking component of the greater number of hydrocracking catalysts. It is generally considered that such deactivation results from the formation of a nitrogen-containing complex with the active catalyst sites. Thus, the active sites become increasingly neutralized necessitating ever increasing reaction temperatures to maintain a given conversion level. Eventually, side reactions induced by excessive reaction temperatures increase to such an extent that it becomes necessary to regenerate or replace the deactivated catalyst. The deactivation reaction is one not readily reversible merely by heating the catalyst in the presence of hydrogen for the purpose of decomposing the nitrogen-containing complex.

Thus, the hydrocracking process is usually carried out in two or more stages, the first stage being a hydrogenation stage to remove deleterious nitrogenous compounds in the hydrocarbon feed, and the second stage being the actual hydrocracking stage. Hydrogenation in the first stage is sufficiently severe to assure substantially complete conversion of the nitrogenous compounds to readily separable ammonia, and said hydrogenation is conducted at an optimum low temperature effecting a minimal saturation of the aromatic components. This necessitates a catalyst which is substantially inert to the poisoning effect of nitrogenous compounds and at the same time active in converting the same to ammonia and a corresponding hydrocarbon residue.

It is an object of this invention to present a novel method of preparing a catalytic composite. It is another object to present a novel method of preparing a catalytic composite particularly active with respect to the conversion of nitrogenous compounds in a petroleum fraction whereby they are readily separable therefrom. It is a further object to present a novel hydrotreating process for the separation of nitrogenous compounds from a petroleum hydrocarbon fraction, which process utilizes a catalyst prepared in accordance with the method of this invention.

In one of its broad aspects the present invention embodies a method of preparing a catalytic composite which comprises dispersing a crystalline alumino-silicate in an aqueous solution comprising ammonium hydroxide and aluminum sulfate in a ratio to effect a pH of from about 3.8 to about 4.5, commingling the resulting mixture with an acidified alkali metal silicate solution containing the anion of the acidification agent in a mole ratio of from about 1.1 to about 1.5 with the alkali metal content thereof, treating the resulting gel with a solution of a metal of Group II of the Periodic Table at base-exchange conditions and compositing the base-exchanger gel particles with at least one metal of Groups VI–B and VIII.

Other objects and embodiments of this invention will become apparent in the following detailed specification.

In the preparation of the catalytic composite of this invention, aluminum sulfate is utilized as an alumina source, the aluminum sulfate being prepared in aqueous solution with ammonium hydroxide in a ratio to effect a pH of from about 3.8 to about 4.5. The crystalline alumino-silicate component of the catalyst is dispersed in the aforesaid aqueous solution in a finely divided state in an amount to comprise from about 10 weight percent to about 20 weight percent of the final catalyst composite, and the resulting mixture commingled with an acidified alkali metal silicate solution hereinafter described. The aforesaid aqueous solution of ammonium hydroxide and aluminum sulfate is prepared by admixing ammonium hydroxide and aluminum sulfate in an aqueous solution in a ratio to effect a pH of from about 3.8 to about 4.5, preferably, from about 3.9 to about 4.1. The result is an aluminum sulfate partial hydrolysis product substantially equivalent to the formula $Al_2SO_4(OH)_4$. As a practical matter, the partial hydrolysis is effected in aqueous solution, usually by the addition of a dilute ammonium hydroxide solution to a thoroughly stirred aqueous aluminum sulfate solution. The aluminum sulfate partial hydrolysis product herein contemplated may be described as a preneutralized aluminum sulfate wherein two of the sulfate radicals have been replaced with hydroxy radicals. However, if may very well be that the partial hydrolysis product exists as a chemical complex which comprises a ratio of about two hydroxy groups per aluminum ion. In any case, the partial hydrolysis product of this invention is unique with respect to the other hydrolysis products of aluminum sulfate in that it exists in a substantially clear water-white solution as opposed to a milky-white precipitate or gel.

In the further preparation of the catalyst composite in accordance with the method of this invention, a crystalline alumino-silicate is dispersed in the ammonium hydroxide-aluminum sulfate solution. The crystalline alumino-silicates utilized in accordance with the method of this invention are frequently referred to as zeolites or molecular sieves and may be those which are naturally occuring or synthetically prepared. These materials are essentially the dehydrated forms of crystalline hydrous siliceous zeolites containing varying amounts of aluminum and alkali metal with or without other metals. The alkali metal atoms are arranged with the silicon, aluminum and oxygen atoms in the form of an alumino-silicate salt in a definite and consistent crystal pattern.

Crystalline alumino-silicates may be prepared in any conventional or otherwise convenient manner. One preferred method comprises forming an aqueous solution of sodium aluminate and sodium hydroxide and adding silica thereto, preferably in a powdered form. Alternatively, a silica sol is suitably employed as a silica source. The resulting reaction mixture preferably comprises a molar ratio of $Na_2O$ to $SiO_2$ of at least about 0.4 to 1 and generally not in excess of about 2 to 1. Sodium aluminate in a molar ratio of $Na_2O$ to $Al_2O_3$ of about 1.5 to 1 is suitably employed. The amounts of silica and sodium aluminate solution are such that the molar ratio of silica to alumina in the final product is at least 3.0 to 1.0. Preferably, the reaction mixture has a composition expressed as a mixture of oxides as follows: $SiO_2$ to $Al_2O_3$ in a ratio of about 6 to 20, $Na_2O$ to $SiO_2$ in a ratio of about 0.6 to 1.5 and $H_2O$ to $Na_2O$ in a ratio of about 35 to 60. In any case, the reaction mixture is aged at about room temperature for a period of 1 to 24 hours or more and thereafter heated, usually at a temperature of about 212° F., in a closed vessel to avoid water loss. The crystalline alumino-silicate reaction product which precipitates from the hot reaction mixture is separated and water-washed until the water in equilibrium with the crystals attains a pH of from about 9 to about 12. Suitable crystalline alumino-silicates or zeolites include faujasite, chabazite, mordenite, and the like. Those crystalline alumino-silicates characterized by pore openings of from about 6 to about 17 Angstroms are generally preferred in hydrocarbon conversion processes. The crystalline alumino-silicate may be dried before being dispersed in the aforementioned solution as aforesaid or said alumino-silicate can be added prior to drying.

Pursuant to the method of this invention, the crystalline alumino-silicate dispersed in the aqueous ammonium hydroxide-aluminum sulfate solution is commingled with an acidified alkali metal silicate solution. While the alkali metala silicate solution may comprise any of the alkali metals, it is most convenient to utilize a potassium silicate solution, and preferably a sodium silicate solution, more commonly known as water glass. In accordance with the method of this invention, the alkali metal silicate solution, hereinafter referred to as water glass solution, is acidified, a mineral acid such as sulfuric or hydrochloric acid being generally employed as an acidification agent. In any case, it is essential that the water glass solution be acidified to contain the anion of the acidification agent, e.g., sulfate, chloride, etc., in a mole ratio of from about 1.1 to about 1.5 with the alkali metal content of the solution, a mole ratio of from about 1.1 to about 1.3 being preferred. Within the stated limitations, the acidified water glass solution is stable and can be commingled with the ammonium hydroxide-aluminum sulfate solution without premature gelation. While a higher ratio is operable, this entails subsequent successive washings which is both time consuming and deleterious to the finished product. The acidified water glass solution is prepared by conventional methods, for example, an aqueous water glass solution is admixed with the mineral acid while maintaining the mixture below 60° F. to obviate polymerization of the resulting silicic acid and premature gelation.

The described individual preparations, that is, the alumino-silicate-ammonium hydroxide-aluminum sulfate mixture and the acidified water glass solution, are admixer whereby gelation occurs after a relatively brief period. However, the resulting mixture is sufficiently stable to allow the components thereof to be thoroughly commingled before the mixture sets into a gel. Thus, the mixture can be formed into spheroidal gel particles by the well-known oil drop method. This method entails commingling the aforementioned individual preparations substantially immediately before the resulting mixture is dispersed as droplets into a water-immiscible suspending medium, usually a light gas oil. The individual preparations are charged to the mixing vessel in separate streams at a rate to insure a final catalyst composite of the desired silica-alumina ratio, a ratio of from about 3:1 to about 3:7 being preferred. By this method, the droplets form into firm gel particles as they gravitate through the suspending medium which may or may not be heated, for example, to establish a suitable viscosity allowing the droplets to gravitate therethrough at a suitable rate. Generally, the suspending medium is a light gas oil maintained at a temperature of from about 120° F. to 212° F. although higher temperatures may be employed provided that a pressure is imposed sufficient to maintain the water portion of the droplets in a substantially liquid phase. In any case, the resulting gel particles are aged in an alkaline medium and base-exchanged with a metal of Group II of the Periodic Table as hereinafter described.

The alkaline aging medium may consist of the oil suspending medium itself and containing gaseous ammonia dispersed therein. However, although aqueous ammonia has been previously avoided as an aging medium in view of its tendency to leach alumina from the particles, it has been found surprisingly advantageous when used in a concentration of from about 5% to about 30%, a concentration in an intermediate range, say from about 10% to about 15% being preferred. Aqueous ammonia in the stated concentration range not only appreciably reduces breakage of the particles but does not leach alumina therefrom. Suitable aging is accomplished in from about 0.5 to about 4 hours time.

One alternative method comprises admixing said individual preparations and allowing gelation to occur in a batch type of operation. The resulting slurry is aged at an alkaline pH and thereafter filtered and washed to concentrate and partially remove the soluble salts. The filter cake is reslurred in water to a smooth consistency and subjected to spray drying whereby the aqueous slurry is sprayed in an atomized state into an atmosphere of hot, inert gases to effect a rapid evaporation of moisture so that dry particles of predetermined size range fall out of the spray. The spray dried material may thereafter be subjected to multiple stage washing to reduce the soluble content thereof. The resulting composite is thereafter dried, usually at a temperature of from about 300° F. to about 700° F. It is contemplated that the silica-alumina composite containing the crystalline alumino-silicate dispersed therein may be, upon gelation, formed into other particles of definite size and shape. For example, a suitable pelleting agent including a hydrogenated vegetable oil, graphite, and the like, is commingled with the gelled product in a powdered form and the mixture thereafter compressed into pellets.

Regardless of the particular method or circumstance of gelation, the resulting gel particles are treated with a solution of a soluble compound of a metal of Group II at base-exchange conditions whereby the aluminosilicate portion thereof is base-exchanged substantially free of alkali metal, the practice being well established in the art. Thus, the aluminosilicate-silica-alumina composite is maintained in contact with an aqueous solution of a soluble compound of beryllium, magnesium, calcium, zinc, strontium, barium, etc., for a sufficient time to replace from about 75% to about 90% or more of the alkali metal contained in said alumino-silicate. Suitable soluble compounds of Group II metals include beryllium bromide, beryllium chloride, beryllium nitrate, beryllium orthophosphate, magnesium acetate, magnesium orthoborate, magnesium permanganate, magnesium selenate, magnesium thiosulfate, etc. The base-exchange reaction may be effected at a temperature ranging from about room temperature to about the boiling point of the base-exchanged solution. A temperature of about 200° F. is suitably employed.

The catalytic composite of this invention further comprises at least one metal of Groups VIB and VIII in the oxidized or reduced state. Said metals include molybdenum, tungsten and chromium of Group VIB, and iron, nickel, cobalt, platinum, palladium, ruthenium, rhodium, iridium and osmium of Group VIII. Of the Group VIII metals, preferably comprising from about 0.1 to about 10 weight percent of the final catalyst composite, nickel is preferred, particularly in combination with a Group VIB metal, preferably comprising at least about 6 weight percent of the final catalyst composite, and preferably tungsten. The selected metal or metals can be composited with the aluminosilicate-silica-alumina particles in any conventional or otherwise convenient manner. For example, said particles can be soaked, dipped, suspended or otherwise immersed in a solution of a suitable compound of one or more metals of Groups VIB and VIII. Alternatively, the metals can be composited with said particles utilizing individual solutions thereof and in any convenient sequence. Suitable compounds of metals of Group VI–B and VIII include ammonium molybdate, ammonium paramolybdate, molybdic acid, molybdenum trioxide, ammonium chromate, ammonium peroxy chromate, chromium acetate, chromus chloride, chromium nitrate, ammonium metatungstate, tunstic acid, nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric chloride, ferric bromide, ferric fluoride, ferric nitrate, ferric sulfate, ferric formate, ferric acetate, platinum chloride, chloroplatinic acid, chloropalladic acid, palladic acid, etc. The final catalyst composite after all of the catalytic components are present therein, is usually dried for a period of from about 2 to about 8 hours or more in a steam drier, and subsequently oxidized in an oxygen-containing atmosphere, such as air, at an elevated temperature of from about 1100° F. to about 1700° F. for a period of from about 1 to about 8 hours or more. Following this high temperature oxidation procedure, the catalyst may be reduced for a period ranging from about ½ hour to about 1 hour at a temperature in the range of from about 700° F. to about 1000° F. in the presence of hydrogen.

The catalyst thus prepared comprises an amorphous silica-alumina composite, the silica-alumina weight ratio being from about 3:1 to about 3:7, with a crystalline alumino-silicate dispersed therein to the extent of from about 10 weight percent to about 20 weight percent of the final catalyst composite, the catalyst further comprising at least one metal of Groups VI–B and VIII composited therewith. The Group VI–B metal, when employed, comprises at least 6 weight percent of the final catalyst composite and the Group VIII metal, when employed, comprises from about 0.1 weight percent to about 10 weight percent. The group VI–B metal, tungsten being preferred, and the Group VIII metal, nickel being preferred, are most advantageously employed in combination, particularly when the catalyst composite is utilized in the hydrotreating of petroleum hydrocarbon fractions containing nitrogenous compounds.

The catalyst composite prepared as herein described, can be used advantageously to effect a variety of hydrocarbon conversion reactions involving reaction conditions comprising a temperature in the 70–1400° F. range. The catalyst is particularly useful in effecting the separation of nitrogenous compounds from petroleum hydrocarbon fractions hereinabove described. Thus, a petroleum hydrocarbon fraction containing nitrogenous compounds is heated together with hydrogen at a temperature of from about 500° F. to about 1000° F. and at a pressure of from about 100 p.s.i.g. to about 3000 p.s.i.g. in contact with the catalyst of this invention, the hydrogen being suitably employed in a ratio of from about 3000 to about 8000 standard cubic feet per barrel of hydrocarbon charge. The nitrogenous compounds are thereby converted to ammonia which is readily separated from the reactor effluent. In particular, a catalyst composite prepared as herein described and containing amorphous silica-alumina in a weight ratio of about 3.2 with from about 15 weight percent to about 20 weight percent faujasite dispersed therein, and further comprising from about 6 to about 30 weight percent tungsten and from about 0.1 to about 10 weight percent nickel composited therewith, is effectively employed for the separation of nitrogenous compounds.

The following examples are in illustration of preferred embodiments of this invention and are not intended to serve as an undue limitation on the generally broad scope of the invention as set out in the appended claims.

Example I

A catalyst comprising nickel and tungsten supported on an amorphous silica-alumina composited with a faujasite was prepared as follows:

A 28% aqueous aluminum sulfate solution (2731 cc.) was preneutralized by adding the same to a vigorously stirred 28% aqueous ammonia solution (672 cc.) To the resulting solution was added 80 grams of powdered faujasite (64.7% $SiO_2$, 22.6% $Al_2O_3$ and 13.1% $NaO_2$), the faujasite powder being maintained thoroughly dispersed therein by vigorous stirring. In a separate vessel, an acidified water glass solution was prepared by the addition of 1593 cc. of chilled dilute water glass solution (sp. gr. 1.272, $SiO_2$ 18.49%, Na 4.18%) to 1150 cc. of rapidly stirred 12.6% hydrochloric acid at a temperature below 60° F. The faujasite-preneutralized aluminum sulfate mixture and the acidified water glass solution were charged in separate streams to a mixer substantially immediately prior to dispersing the resulting mixture as droplets into a column of hot oil whereby spheroidal gel particles were formed. The gel particles were aged 1 hour at room temperature in 10% aqueous ammonia, water-washed for about 3 hours at 203° F. and ion-exchanged with a 1% aqueous magnesium chloride solution for 16 hours at 203° F. The spheres were then washed and dried and calcined at 1250° F. for 3 hours. The calcined spheres analyzed 55.72% $SiO_2$, 38.84% $Al_2O_3$, 5.22% MgO and 0.38% $Na_2O$. The calcined spheres (168 gm.) were thereafter immersed in an aqueous solution (203 cc.) containing 18.5 grams of nickelous nitrate and 42.8 grams of ammonium metatungstate, the solution being subsequently evaporated to dryness in a rotary steam dryer. The final catalyst, upon drying and calcining at 1100° F. for 1 hour, analyzed 1.8% nickel and 14.6% tungsten.

Example II

In the evaluation of the catalyst of Example I, a vacuum gas oil was processed over the catalyst at a liquid hourly space velocity of 2.0 together with 15,000 standard cubic feet per barrel recycle hydrogen. The temperature and pressure were maintained at 750° F. and 1500 p.s.i.g. The vacuum gas oil charge stock was characterized by an initial boiling point of 550° F. with 95% distilling over at 950° F. Total nitrogen was 1150 p.p.m., sulfur content was 1.7% and aromatics were present to the extent of 56%. The reaction product analyzed 1.8 p.p.m. nitrogen, 0.02% sulfur and 42% aromatics.

Example III

A catalyst was prepared in accordance with the method set out in Example I with the exception that the faujasite was excluded. The catalyst was evaluated with the charge stock and process conditions of Example II to yield a product which analyzed 72 p.p.m. nitrogen, 0.02% sulfur and 33% aromatics.

We claim as our invention:

1. A method of preparing a catalytic composite which comprises dispersing a crystalline aluminosilicate in an aqueous solution comprising ammonium hydroxide and aluminum sulfate in a ratio to effect a pH of from about 3.8 to about 4.5, commingling the resulting mixture with an acidified alkali metal silicate solution containing the anion of the acidification agent in a mol ratio of from about 1.1 to about 1.5 with the alkali metal content thereof and gelling the mixture, treating the resulting gel with a solution of a soluble compound of a metal of Group II at base-exchange conditions and compositing the base-exchanged gel particles with at least one metal of Groups VI-B and VIII.

2. The method of claim 1 further characterized in that said acidified alkali metal silicate solution comprises an aqueous water glass solution acidified with hydrochloric acid.

3. The method of claim 2 further characterized in that said crystalline aluminosilicate is utilized in an amount to comprise from about 10 weight percent to about 20 weight percent of the final catalyst composite.

4. The method of claim 3 further characterized in that said crystalline aluminosilicate is a faujasite characterized by a silica-alumina ratio greater than 3.

5. The method of claim 4 further characterized in that said acidified water glass solution and said ammonium hydroxide-aluminum sulphate solution are commingled in a ratio to effect a final catalyst composite comprising amorphous silica and alumina in a weight ratio of from about 3:1 to about 3:7.

6. The method of claim 5 further characterized in that said metal of Groups VI-B and VIII is tungsten utilized in an amount to comprise at least about 6 weight percent of the final catalyst composite.

7. The method of claim 6 further characterized in that said metal of Groups VI-B and VIII include nickel utilized in an amount to comprise from about 0.1 to about 10 weight percent of the final catalyst composite.

References Cited

UNITED STATES PATENTS

| | | | |
|---|---|---|---|
| 2,487,065 | 11/1949 | Milliken | 252—451 |
| 2,701,793 | 2/1955 | Ashley | 252—453 |
| 2,900,349 | 8/1959 | Schwartz | 252—451 |
| 3,210,293 | 10/1965 | O'Hara. | |
| 3,238,123 | 3/1966 | Voorhies, Jr., et al. | |
| 3,275,571 | 9/1966 | Mattox | 252—451 |
| 3,329,628 | 7/1967 | Gladrow et al. | 252—453 |

DELBERT E. GANTZ, Primary Examiner

G. J. CRASANAKIS, Assistant Examiner

U.S. Cl. X.R.

208—254; 252—453, 458